Oct. 6, 1953

W. T. BURBANK ET AL 2,654,343

MACHINE FOR MANUFACTURING CONTAINER
ELEMENTS AND THE LIKE

Filed June 21, 1951

INVENTORS
Wendell T. Burbank
Carl T. Colgren

BY
Otto A. Earl
Attorney

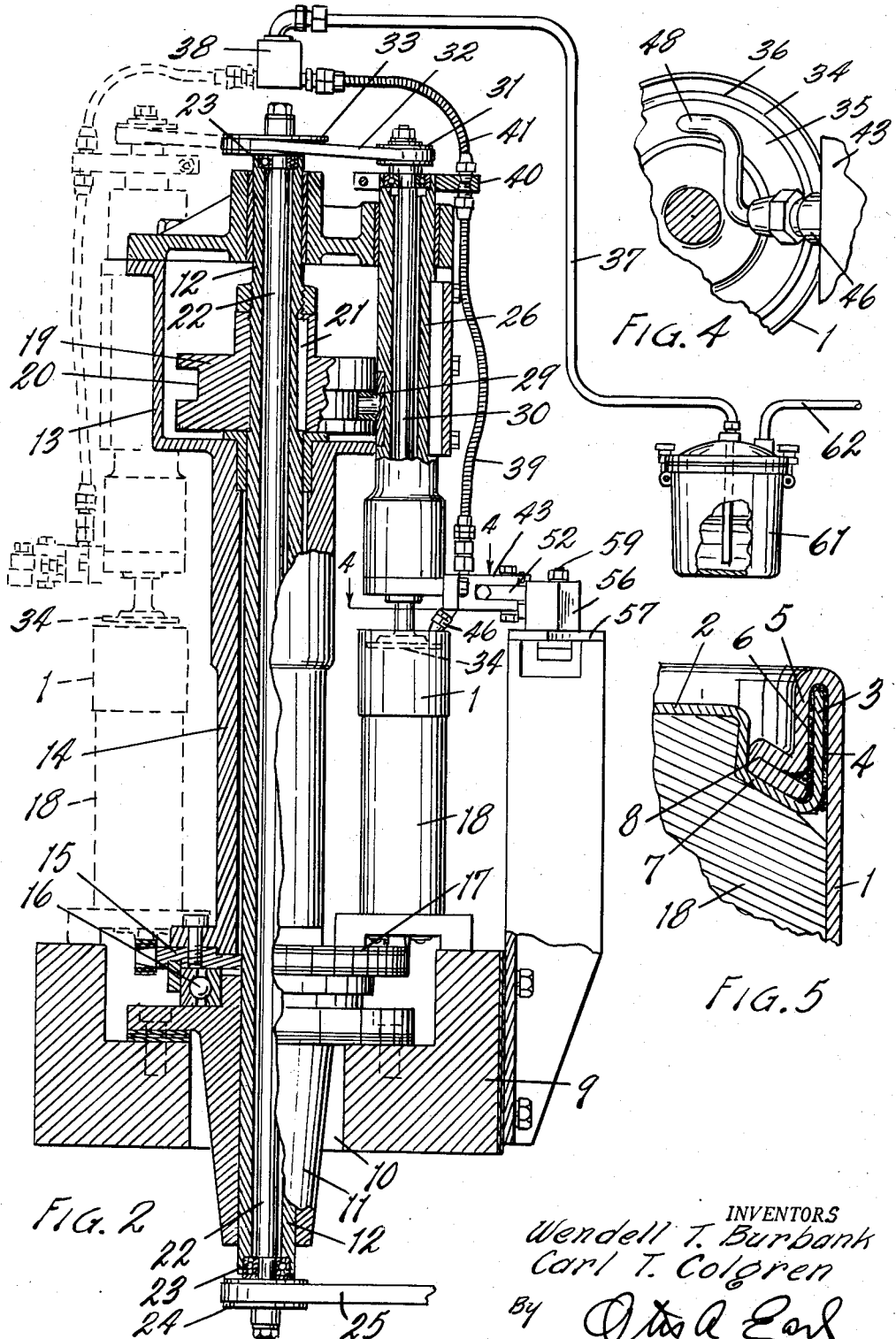

Patented Oct. 6, 1953

2,654,343

UNITED STATES PATENT OFFICE 2,654,343

MACHINE FOR MANUFACTURING CONTAINER ELEMENTS AND THE LIKE

Wendell T. Burbank and Carl T. Colgren, Kalamazoo, Mich., assignors to Sutherland Paper Company, Kalamazoo, Mich.

Application June 21, 1951, Serial No. 232,855

8 Claims. (Cl. 118—317)

This invention relates to improvements in a machine for manufacturing container elements and the like.

The main objects of this invention are:

First, to provide a machine for manufacturing container elements, such as the bodies or covers of containers, and comprising tubular wall members and end members of fibrous material, the end members being adhesively secured within the wall members and, primarily, to means for applying adhesive in predetermined amounts or charges and to a predetermined area.

Second, to provide a machine thus characterized which is of very large capacity and is automatic in its operation.

Third, to provide a machine for applying adhesive to tubular work such as tubular container walls in which the adhesive is very uniformly distributed in an annular strip or band on the inside of the work.

Fourth, to provide a machine having these advantages in which the adhesive is so controlled and delivered that it is not likely to be deposited upon any portion of the work other than the contemplated area.

Fifth, to provide a machine of the type above indicated in which the adhesive distributor is self-cleaning.

Sixth, to provide an adhesive applying machine in which the adhesive supplying and delivery system or means is closed to the atmosphere so that it does not "set" in the apparatus when the machine is not in use even for long periods.

Objects relating to details and economies of the invention will appear from the description to follow. The invention is pointed out in the claims.

A preferred embodiment of the invention is illustrated in the accompanying drawings, in which:

Fig. 2 is a fragmentary view partially in vertical section on a line corresponding to the broken line 2—2 of Fig. 1, the position of the parts at one stage of the cycle of operation of the machine being shown by full lines and at another stage by dotted lines.

Fig. 4 is a fragmentary view in section on a line corresponding to line 4—4 of Fig. 2.

Fig. 5 is an enlarged fragmentary view illustrating the final container forming steps and details of the formed container.

Figure 1:
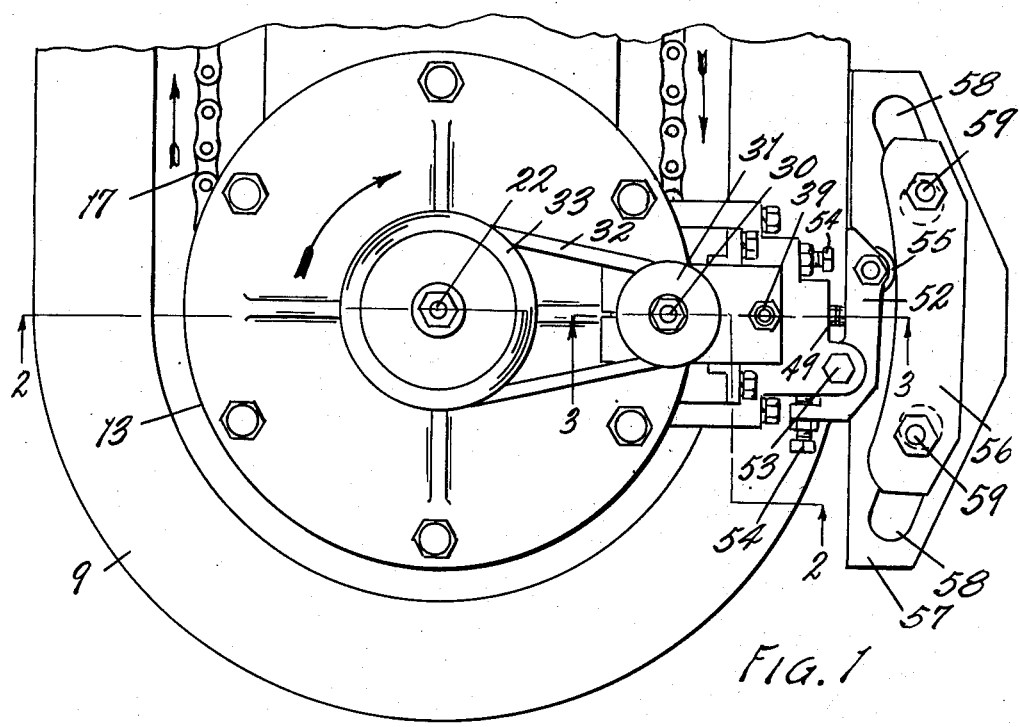
Fig. 1 is a fragmentary plan view of a structure embodying our invention, certain parts being omitted for convenience in illustration.

The embodiment of our invention illustrated in the accompanying drawings is especially designed for the manufacture of container elements, either body elements or cover elements such as are illustrated in our copending application filed concurrently herewith.

In Fig. 5 of the accompanying drawing, we illustrate fragments of a container element consisting of the side wall member 1 and an end wall member 2, the end wall member being provided with an annular flange 3 which is adhesively secured to the wall member 1 by adhesive 4 on the outer side of the flange and also to the inturned portion 5 of the wall member by adhesive 6. In the structure illustrated, the end wall member is provided with an annular channel 7 receiving the folded edge portion 8 of the wall member.

In the accompanying drawing only such portions of the frame 9 are illustrated as is deemed necessary to disclose the operative relation of the parts directly involved. The frame 9 has an opening 10 therein receiving the stirrup-like support 11 for the tubular upright 12. The chambered carrier 13 is provided with a tubular column 14 receiving and rotatable about the upright. At its lower end the column 14 is provided with a sprocket wheel 15 which is supported on the member 11 by means of the ball bearing 16.

The sprocket chain 17 forms a conveyor and is provided with mandrels 18, only one of which is illustrated but it will be understood that in the complete machine the conveyor is provided with several mandrels designed to support the work for successive operations thereon at different stages of travel of the work or translation of the work by the conveyor such, for example, as the several steps illustrated in our said copending application. However, as such operating steps do not constitute a part of our present invention, we do not illustrate them.

A cam member 19 having a peripheral cam groove 20 is secured to the upright 12 by the spline 21, this cam member being arranged within the carrier. The driving shaft 22 is supported in suitable bearings 23 on the upright to project from the upright and is provided with a pulley 24 at its lower end driven through a power belt 25. In practice, the pulley 24 is desirably driven at about 4000 R. P. M. The tubular spindle 26 is reciprocatingly mounted in the carrier and is provided with a cam follower 29 coacting with the cam 19. The driven shaft 30 is mounted in this reciprocating spindle and is provided with a pulley 31 connected by the belt 32 to the pulley 33 on the upper end of the driving shaft 22. This belt connection permits the reciprocatory movement of the driven shaft relative to the driving shaft. The pulleys 31 and 33 are so proportioned that the shaft 30 is driven at a substantially higher speed than the shaft 22.

Figure 3:
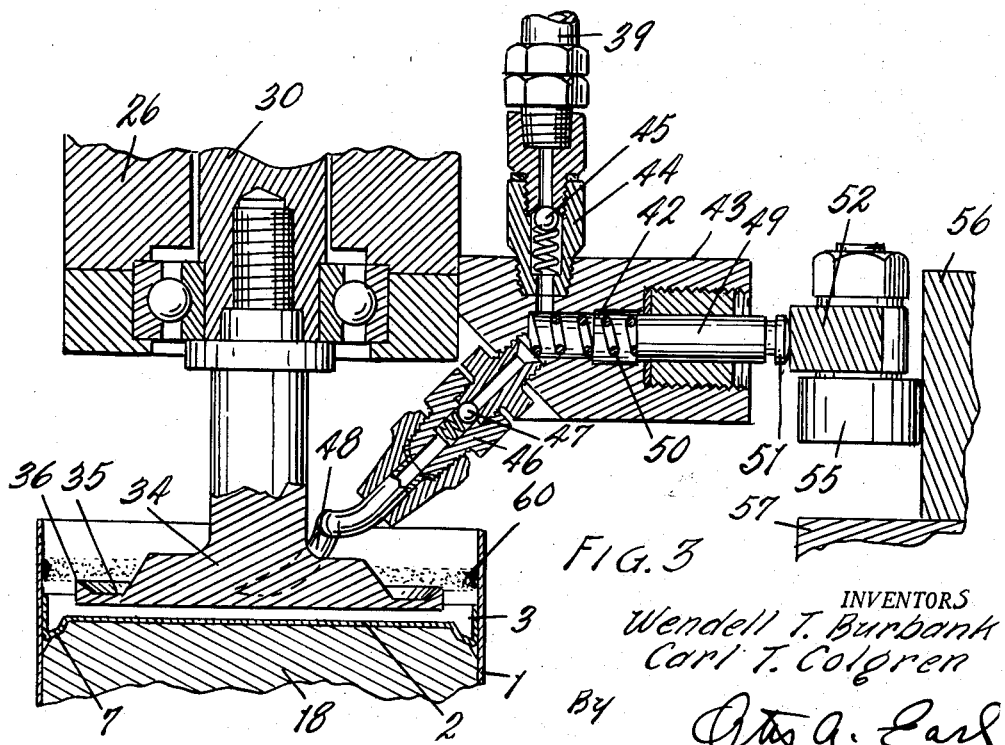
Fig. 3 is an enlarged fragmentary view on a line corresponding to line 3—3 of Fig. 2 particularly illustrating details of the means for feeding adhesive in measured charges.

At its lower end, the driven shaft 30 is provided with a distributor head or member 34 which is provided with an upwardly facing channel 35 in its upper side or face, the outer wall 36 of the channel being outwardly inclined as is shown in Fig. 3. The reciprocation of the spindle 26 is timed relative to the translation of the mandrels 18 on the conveyor so that the distributor is reciprocated into and out of the work as indicated in Fig. 2 by full and dotted line positions.

The adhesive is delivered to the distributor in measured quantities or charges. In the embodiment illustrated, the adhesive is supplied through the conduit 37 connected to the coupling 38 located above the parts described and desirably swivelled. The feed conduit 39 is mounted at its upper end on the bracket 40 carried by the spindle. The flexible supply conduit 41 connects the coupling 38 to the feed conduit 39.

In the embodiment illustrated, the means for delivering measured charges to the distributor comprise the cylinder 42 in the cylinder block 43 which is mounted on the lower end of the spindle. The feed conduit 39 is connected to the cylinder by the couplings 44 which has a return check valve 45 therein. The discharge 46 of the cylinder is provided with a return check valve 47 and delivers through the nozzle 48 into the channel 35 of the distributor. The plunger 49 is return biased by the spring 50 disposed within the cylinder. The plunger has a head 51 which engages the actuating member 52 pivoted at 53 on the cylinder block as best shown in Fig. 1. An adjustable stop 54 limits the return or outward stroke of the member 52.

The member 52 is provided with a roller 55 which, as the carrier revolves, engages the relatively fixed cam 56 mounted on the bracket 57 on the frame. The bracket 57 has slots 58 therein receiving the bolts 59 on the cam which permits the adjustment of the cam to regulate the stroke as well as the timing of the stroke of the plunger. The distributor is rotated at a high rate of speed to discharge adhesive in an annular band indicated at 60 in Fig. 3, the adhesive being thrown or discharged from the distributor by centrifugal force incident to the rotation of the distributor. The inclined wall 36 of the channel 35 sufficiently retards the discharge of the adhesive so that it is uniformly distributed at an annular band around the inside of the work. One of the advantages is that each charge of the adhesive is fully discharged from the distributor so that a predetermined amount is applied to each piece of work. This also prevents fouling of the parts with adhesive while the machine is in use and when the machine is stopped. The cam 19 is so plotted or designed to advance the distributor prior to the point of charging the distributor and to retract it after the distributor has discharged or thrown off the charge. This is indicated, as stated, by full and dotted lines in Fig. 2.

In the succeeding stages in the travel of the mandrel, the wall member 1 is pushed down to distribute adhesive on the outer side of the flange of the end member 2 as is generally shown in Fig. 5. The successive forming steps, as stated, are illustrated in our copending application but it will be understood that the position of the parts shown in Fig. 3 is the initial position in which the adhesive has been distributed for the particular method and that the machine may be used for applying adhesive to other container structures and work.

The adhesive is supplied to the conduit 37 under pressure from the supply tank 61. Air under regulated pressure is delivered to the tank 61 through the pipe 62. This results in a completely closed supply system for the adhesive, that is, the adhesive is at no time previous to its delivery exposed to the air and hence remains liquid for an indefinite period. Even in the case of a prolonged shutdown the machine may be started without clearing of adhesive.

We have illustrated and described our invention in a highly practical commercial embodiment or application thereof. We have not attempted to illustrate or describe various other adaptations or embodiments as it is believed that this disclosure will enable those skilled in the art to embody or adapt the invention as may be desired.

Having thus described our invention, what we claim as new and desire to secure by Letters Patent is:

1. In a machine of the class described, the combination of a support including a tubular upright, a chambered carrier having a tubular column receiving and rotatably associated with said upright, a cam disposed in said carrier chamber and nonrotatably connected to said upright, a vertically reciprocating spindle mounted on said carrier and provided with a follower coacting with said cam whereby the spindle is reciprocated as the carrier is rotated, a driving shaft disposed through said upright and provided with driving connections at its lower end and with a pulley at its upper end, a driven shaft rotatably mounted in said spindle and projecting at the ends thereof and provided with a pulley at its upper end connected to said pulley on said driving shaft by a belt, a distributor mounted on the lower end of said driven shaft, a conveyor provided with a work receiving mandrel and driven in timed relation to the carrier so that the distributor is reciprocated into and out of the work on the mandrel as it is being translated by the conveyor, a charging cylinder mounted on the lower end of said spindle adjacent said distributor, a flexible feed conduit mounted on the upper end of said spindle and connected to a source of adhesive supply and having a return check valve connection to said cylinder, a discharge conduit for said cylinder provided with a return check valve and delivering to said distributor, a plunger reciprocable in said cylinder to discharge a measured charge of adhesive therefrom, said plunger extending outwardly of said cylinder and radially of said spindle and said column, and means for actuating the plunger at a predetermined time in the travel of the carrier.

2. In a machine of the class described, the combination of a support including a tubular upright, a rotatably mounted carrier, a relatively fixed cam, a vertically reciprocating spindle mounted on said carrier and provided with a follower coacting with said cam whereby the spindle is reciprocated as the carrier is rotated, a driving shaft disposed through said upright and provided with a driving connection at its lower end and with a pulley at its upper end, a driven shaft rotatably mounted in said spindle and provided with a pulley at its upper end connected to said pulley on said driving shaft by a belt, a distributor mounted on said driven shaft, a travelling work holder driven in timed relation to the carrier so that the distributor is reciprocated into and out of the work as it is being translated by the conveyor, a charging cylinder mounted on the lower end of said spindle adjacent said distributor, a feed conduit mounted on said spindle and connected to a source of supply and having a return check valve connection to said cylinder, a discharge conduit for said cylinder provided with a return check valve and delivering to said distributor, a plunger coacting with said charging cylinder, a plunger actuating member pivotally mounted on said cylinder to coact with said plunger, and a cam adjustably fixedly mounted on said support and coacting with said plunger actuating member for actuating the plunger at a predetermined time in the travel of the carrier.

3. In a machine of the class described, the combination of a rotatably mounted carrier, a relatively fixed cam, a vertically reciprocating spindle mounted on said carrier and provided with a follower coacting with said cam whereby the spindle is reciprocated as the carrier is rotated, a driven shaft rotatably mounted in said spindle, a distributor mounted on said driven shaft, a travelling work holder driven in timed relation to the carrier so that the distributor is reciprocated into and out of the work as it is being translated by the conveyor, a charging cylinder mounted on the end of said spindle adjacent said distributor, a feed conduit mounted on said spindle and connected to a source of supply and having a return check valve connection to said cylinder, a discharge conduit for said cylinder provided with a return check valve and delivering to said distributor, a plunger coacting with said charging cylinder, a plunger actuating member pivotally mounted on said cylinder to coact with said plunger, and a cam coacting with said plunger actuating member for actuating the plunger at a predetermined time in the travel of the carrier.

4. In a structure of the class described, the combination of a travelling work support, a travelling carrier, a reciprocatingly mounted spindle, means for reciprocating the spindle in timed relation to the travel of the work support, a driven shaft carried by said spindle to reciprocate therewith, a distributor on said shaft, and means including a positively driven displacement element for delivering measured charges to the distributor.

5. In a machine of the class described, the combination of a rotatably driven adhesive distributor, means for delivering measured charges of adhesive to said distributor comprising a charging cylinder, a delivery conduit for said charging cylinder delivering to said distributor, said delivery conduit being provided with a return check valve, a closed adhesive supply receptacle under regulated air pressure, a closed feed conduit from said adhesive supply receptacles to said cylinder provided with a return check valve, a plunger coacting with said charging cylinder, and means for actuating said plunger for delivering charges to said distributor, said charging cylinder and said adhesive supply and delivery connection therefor in advance of said delivery conduit check valve being closed to the atmosphere.

6. In a machine of the class described, the combination of a rotatably driven adhesive distributor having a channel around its periphery, means for delivering measured charges of adhesive to said distributor comprising a charging cylinder, a delivery conduit for said charging cylinder delivering into said channel of said distributor, said delivery conduit being provided with a return check valve, means forming a closed adhesive supply conduit delivering under pressure to said charging cylinder and provided with a return check valve, a plunger coacting with said charging cylinder, and means for actuating said plunger for delivering charges to said distributor, said charging cylinder and said adhesive supply means and delivery connection therefor in advance of said delivery conduit check valve being closed to the atmosphere.

7. In a machine of the class described, the combination of a rotatably driven adhesive distributor having a channel around its periphery, means for delivering measured charges of adhesive to said distributor comprising a charging cylinder, a delivery conduit for said charging cylinder provided with a return check valve and delivering into said channel of said distributor, means forming a closed adhesive supply conduit delivering under pressure to said charging cylinder and provided with a return check valve, a plunger coacting with said charging cylinder, and means for actuating said plunger for delivering charges to said distributor, said charging cylinder and said adhesive supply means and delivery connection therefor being closed to the atmosphere.

8. In a machine of the class described, the combination of a rotatably driven adhesive distributor, means for delivering measured charges of adhesive to said distributor including a delivery conduit provided with a return check valve, and means forming an adhesive supply for said charge delivery means, said charge delivering means and said adhesive supply and delivery connection therefor in advance of said delivery conduit check valve being closed to the atmosphere.

WENDELL T. BURBANK.
CARL T. COLGREN.

References Cited in the file of this patent

UNITED STATES PATENTS

| Number | Name | Date |
|---|---|---|
| 1,764,437 | Elsasser | June 17, 1930 |
| 2,336,946 | Marden et al. | Dec. 14, 1943 |
| 2,383,023 | Sykes et al. | Aug. 21, 1945 |
| 2,480,663 | McNab | Aug. 30, 1949 |
| 2,508,709 | Goetchius | May 23, 1950 |